United States Patent
Eatough et al.

(10) Patent No.: US 7,529,809 B1
(45) Date of Patent: May 5, 2009

(54) SYSTEMS AND METHODS FOR EFFICIENTLY USING NETWORK BANDWIDTH TO DOWNLOAD RESOURCES

(75) Inventors: David A. Eatough, Herriman, UT (US);
Gregory P. Olsen, Lindon, UT (US);
Paul B. Hillyard, Lindon, UT (US)

(73) Assignee: LANDesk Software, Inc., South Jordan, UT (US)

( * ) Notice: Subject to any disclaimer, the term of this patent is extended or adjusted under 35 U.S.C. 154(b) by 686 days.

(21) Appl. No.: 11/294,248

(22) Filed: Dec. 5, 2005

(51) Int. Cl.
*G06F 15/16* (2006.01)
*G06F 12/00* (2006.01)

(52) U.S. Cl. ...................... 709/218; 709/226

(58) Field of Classification Search ............. 709/218, 709/225, 226, 229, 250
See application file for complete search history.

(56) References Cited

U.S. PATENT DOCUMENTS

| | | | |
|---|---|---|---|
| 5,982,784 A * | 11/1999 | Bell | 370/485 |
| 6,636,512 B1 * | 10/2003 | Lorrain et al. | 370/392 |
| 6,963,580 B2 * | 11/2005 | Chien et al. | 370/445 |
| 7,257,816 B2 * | 8/2007 | Kulp et al. | 718/104 |
| 2002/0110084 A1 | 8/2002 | Butt et al. | |
| 2003/0187931 A1 | 10/2003 | Olsen et al. | |
| 2005/0259536 A1 * | 11/2005 | Smyers | 369/47.1 |

* cited by examiner

*Primary Examiner*—Zarni Maung
(74) *Attorney, Agent, or Firm*—Austin Rapp & Hardman

(57) ABSTRACT

In an exemplary method, a computer system within a subnet of a computer network sends a discovery request to other computer systems within the subnet. The discovery request comprises a request for a resource. The computer system downloads an available portion of the resource from the other computer systems in the subnet. If there is a remaining portion of the resource that is not available from the other computer systems in the subnet but that is available from a remote source, and if there is at least one other computer system in the subnet that is also seeking to obtain the remaining portion of the resource, the computer system negotiates with the at least one other computer system about downloading the remaining portion of the resource from the remote source. If no other computers in the subnet require the resource, then the remaining portion of the resource may be downloaded directly from the remote source.

20 Claims, 15 Drawing Sheets

SYSTEMS AND METHODS FOR EFFICIENTLY USING NETWORK BANDWIDTH TO DOWNLOAD RESOURCES

TECHNICAL FIELD

The present invention relates generally to computers and computer-related technology. More specifically, the present invention relates to systems and methods for subnet aware downloading of resources.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly computer software is also frequently upgraded or replaced. New computer hardware and software is continually being integrated into systems across the world.

Installing new computer hardware and/or software, or fixing problems with existing systems, may cause down-time during which the business or individual operates at a diminished level. Most individuals and businesses try to minimize computer problems so as to avoid down-time.

When a business or individual is trying to decide whether to make a change to a computer system, the concern about down-time may outweigh the benefit of the installation or change in influencing the decision. An important concern regarding down-time is the ability to access wide area networks (WAN). The impact that installations will have on WAN links is a important consideration. The professional computer service industry which carries out and supports installations and upgrades has been rapidly expanding. However, even with such computer professional support, the threat of such down-time coupled with the costs of such professional services is a concern.

As corporate performance and end-user productivity have become increasingly dependent on computers, computer support personnel are continuously under pressure to accomplish more with existing or reduced staff head counts. They are also under pressure to perform tasks as efficiently as possible which may include minimizing effects to existing computer systems and networks.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
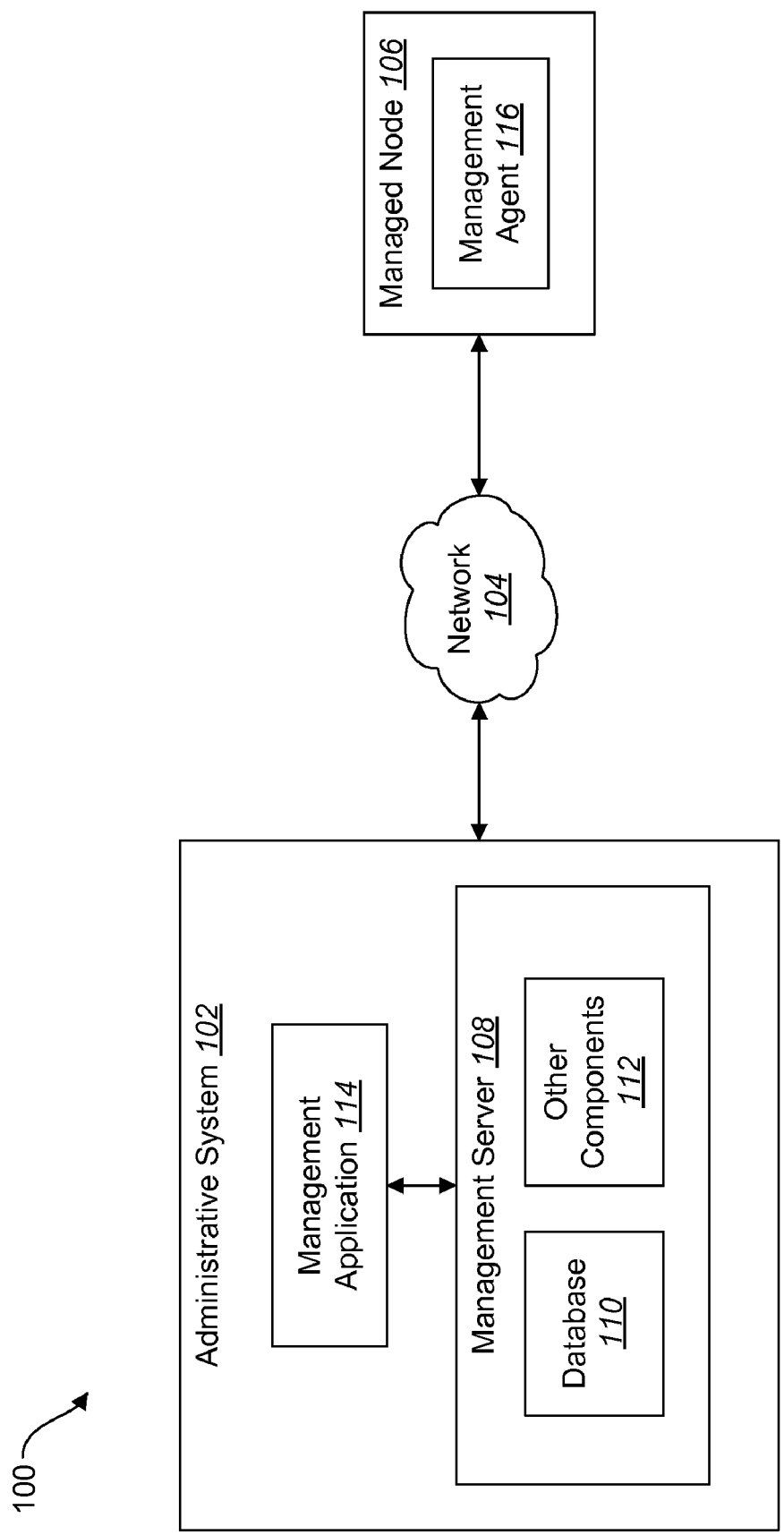
FIG. 1 illustrates an exemplary system in which some embodiments may be practiced, the system including an administrative system and a managed node.

Embodiments disclosed herein relate to systems and methods for efficiently using network bandwidth to download resources. In an exemplary method, a computer system sends a discovery request to other computer systems within a selected segment of a computer network. The term "segment," as used herein, may refer to a subnet, a multicast alias domain, etc. The discovery request includes a request for one or more resources. It may occur that all of the desired resource (s) are available from the other computer systems in the selected network segment. Alternatively, none of the desired resource(s) may be available from the other computer systems in the selected network segment. Alternatively still, only some of the desired resource(s) may be available from the other computer systems in the selected network segment. The computer system downloads whatever portions of the desired resource(s) that are available from the other computer systems in the selected network segment.

The remaining portion of the desired resource(s) (i.e., the portion of the desired resource(s) that is not available from the other computer systems in the selected network segment) may be available from a remote source. A remote source may be any computer system that is located somewhere other than on the local network segment. If the remaining portion is available from a remote source, and if there is at least one other computer system in the selected network segment that is also seeking to obtain the remaining portion of the desired resource(s), then the computer system negotiates with the at least one other computer system(s) in the selected network segment about downloading the remaining portion of the desired resource(s) from the remote source.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 illustrates an exemplary system 100 in which some embodiments may be practiced. An administrative computer system 102 is connected to a computer network 104, such as a corporate local area network (LAN). The administrative system 102 is used to manage other computer systems that are also connected to the computer network 104. These other computer systems will be referred to herein as "managed nodes." For simplicity, only a single managed node 106 is shown in the system 100 of FIG. 1. Of course, the systems in which embodiments disclosed herein are practiced may include many additional managed nodes.

The administrative system 102 includes a management server 108. The management server 108 includes a database 110 of information. The management server 108 also includes various other components 112 that are configured to perform tasks such as scheduling, handling alerts, and so forth. An example of a management server that may be used with embodiments disclosed herein is the core server for the LANDesk® Management Suite.

The administrative system 102 also includes a management application 114. The management application 114 may be used to perform various tasks related to the management of the computer network 104, such as remote control, software distribution, software license monitoring, operating system imaging and migration, IT asset management, problem resolution, and so forth. As part of performing these tasks, the management application 114 may connect to the management server 108 and query the management server 108 for information. An example of a management application 114 that may be used is the console application for the LANDesk® Management Suite. Although a management server 108 is shown in the embodiment depicted in FIG. 1, not all embodiments require a management server 108.

To enable a user of the administrative system 102 to perform management tasks via the management application 114, the managed node 106 includes a management agent 116. The management agent 116 performs management-related tasks in response to requests from the management application 114. An example of a management agent 116 that may be used is the LANDesk® Management Agent.

Figure 2:
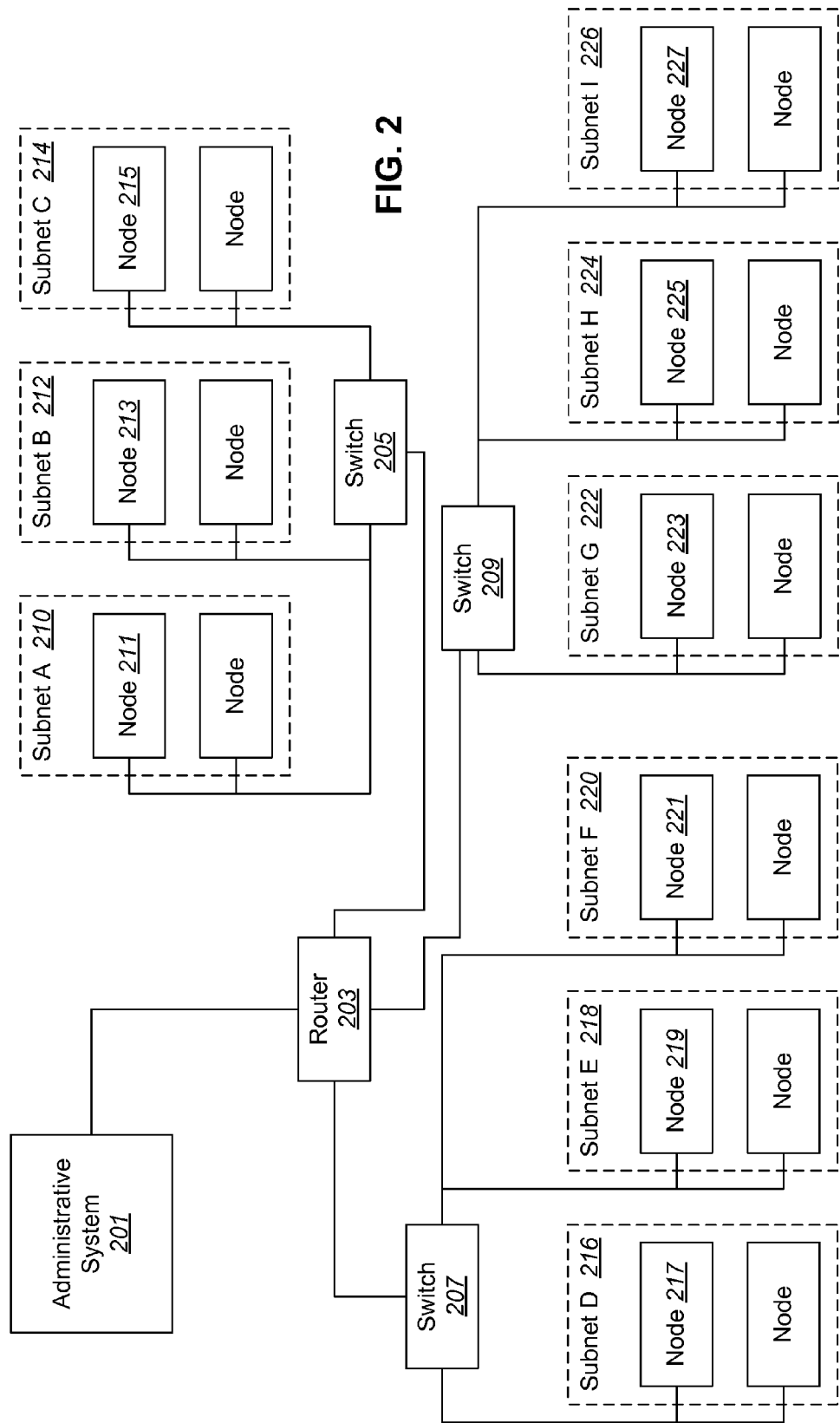
FIG. 2 illustrates a computer network on which the present systems and methods may be implemented.

FIG. 2 illustrates a computer network on which the present systems and methods may be implemented. In FIG. 2, an administrative system 201 connects to a router 203. The router 203 is connected to three switches: a first switch 205, a second switch 207 and a third switch 209. Each switch 205, 207, 209 connects to three subnets. The first switch 205 connects to three subnets: subnet A 210, subnet B 212, and subnet C 214. The second switch 207 connects to three subnets: subnet D 216, subnet E 218, and subnet F 220. The third switch 209 connects to three subnets: subnet G 222, subnet H 224, and subnet 1226. Each subnet includes one or more managed nodes. The managed nodes 211, 213, 215, 217, 219, 221, 223, 225 and 227 represent computer systems or devices on the computer network.

Figure 3:
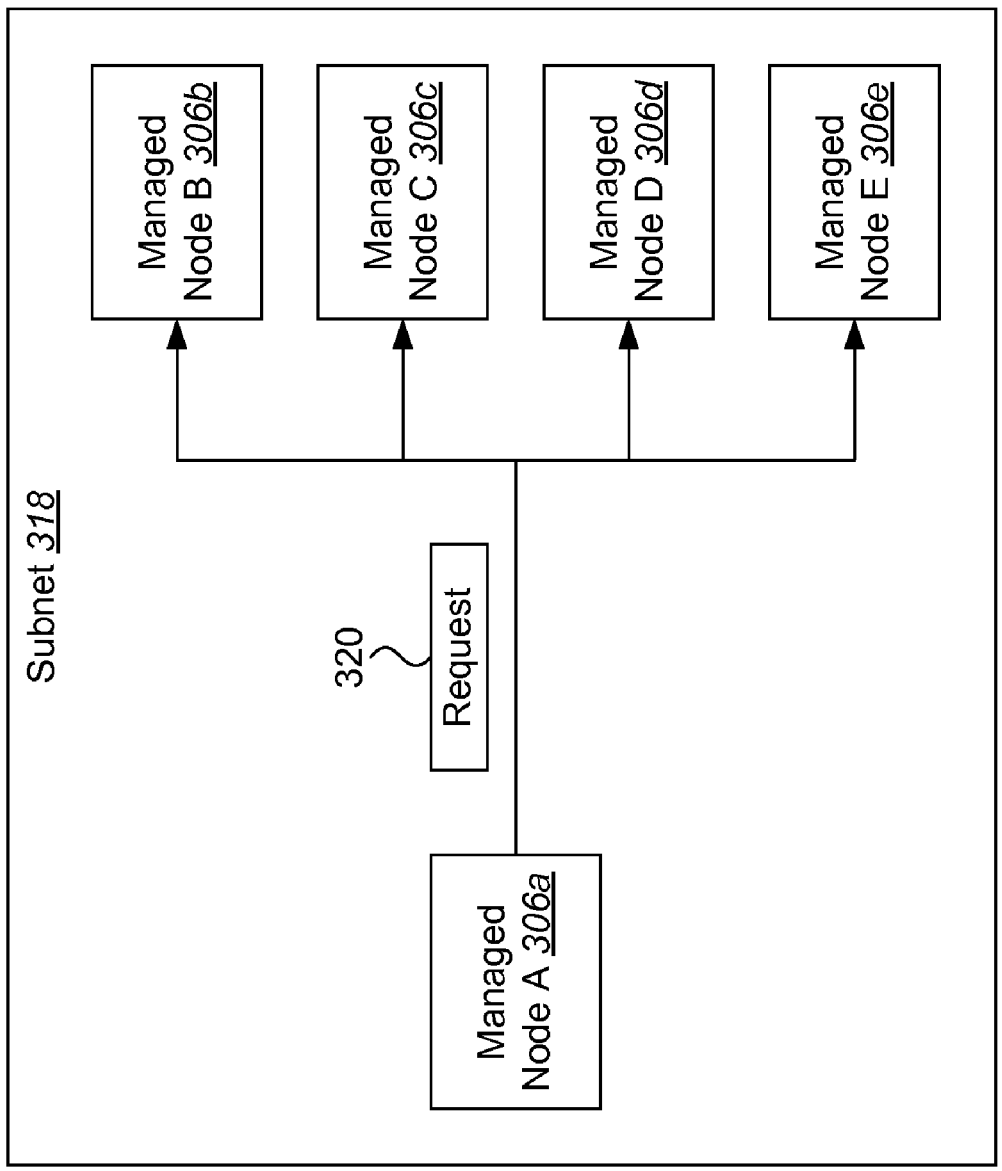
FIG. 3 illustrates the operation of the managed nodes in a subnet according to an embodiment.

FIG. 3 illustrates the operation of the managed nodes 306 in a network segment, such as a subnet 318, according to an embodiment. In the illustrated embodiment, the subnet 318 includes five managed nodes: managed node A 306a, managed node B 306b, managed node C 306c, managed node D 306d, and managed node E 306e.

At some point, managed node A 306a attempts to obtain a resource that it does not have. A "resource" refers to software or data that may be used by a computer program. Some examples of resources include a file, an executable program, dynamic web content such as a response from a CGI or ISAPI application, etc. In order to obtain the desired resource, managed node A 306a sends a discovery request 320 to the other managed nodes 306 in the local subnet 318, i.e., managed node B 306b, managed node C 306c, managed node D 306d, and managed node E 306e.

Figure 4:
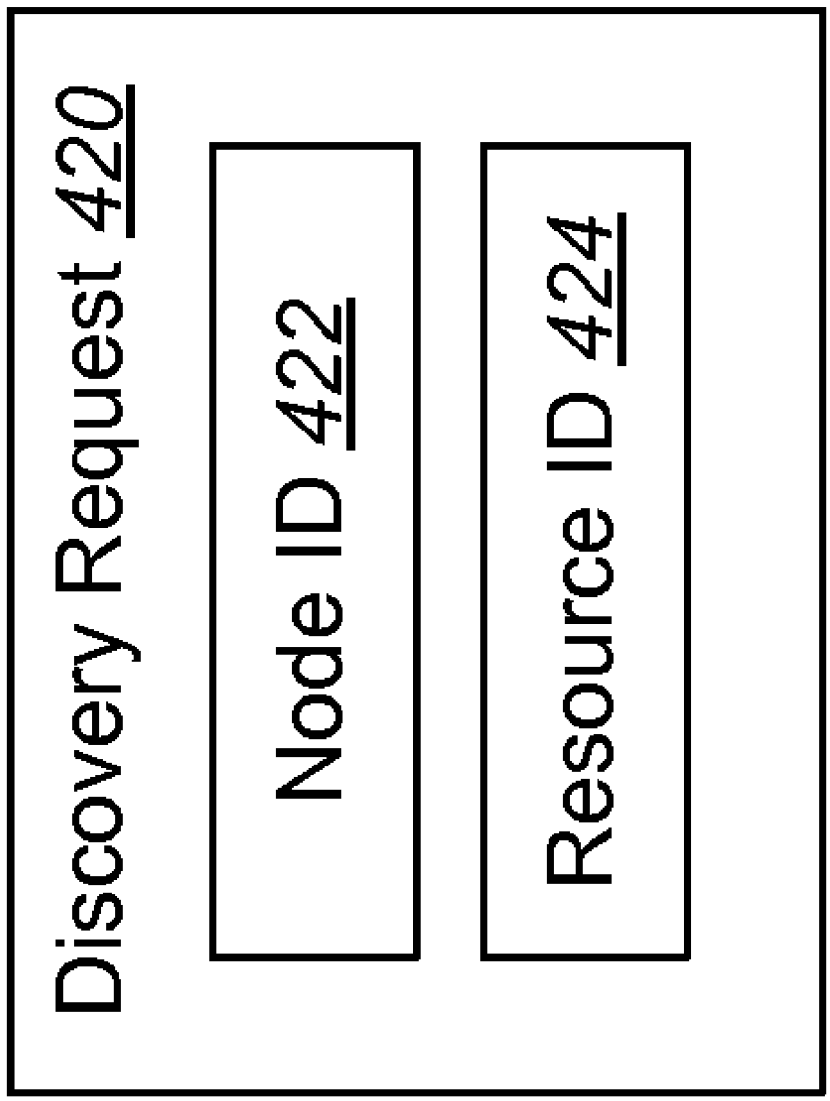
FIG. 4 illustrates an exemplary discovery request that may be sent by a managed node to the other managed nodes in a subnet.

FIG. 4 illustrates an exemplary discovery request 420 that may be used. The discovery request 420 includes a node identifier 422. The node identifier 422 identifies the managed node 306 that is sending the discovery request 420 (which is managed node A 306a in the example shown in FIG. 3).

The discovery request 420 also includes a resource identifier 424. The resource identifier 424 identifies a resource that the managed node 306 is seeking to obtain. Some examples of resource identifiers 424 that may be used include a file name, a file path, a file size, a file date (e.g., the date on which the file was last updated), a Cyclic Redundancy Checking (CRC) value, a hash value, a Uniform Resource Locator (URL) address, a Universal Naming Convention (UNC) path, an identifier from a database for separate list of files, etc. The request 420 may include one or more identifiers for the resource. In this example the discovery request 420 is for a single resource. An alternate embodiment would be to include multiple resource identifiers in a single discovery request. For example, the discovery request may include requests for resource A, resource B, and resource C.

Figure 5:
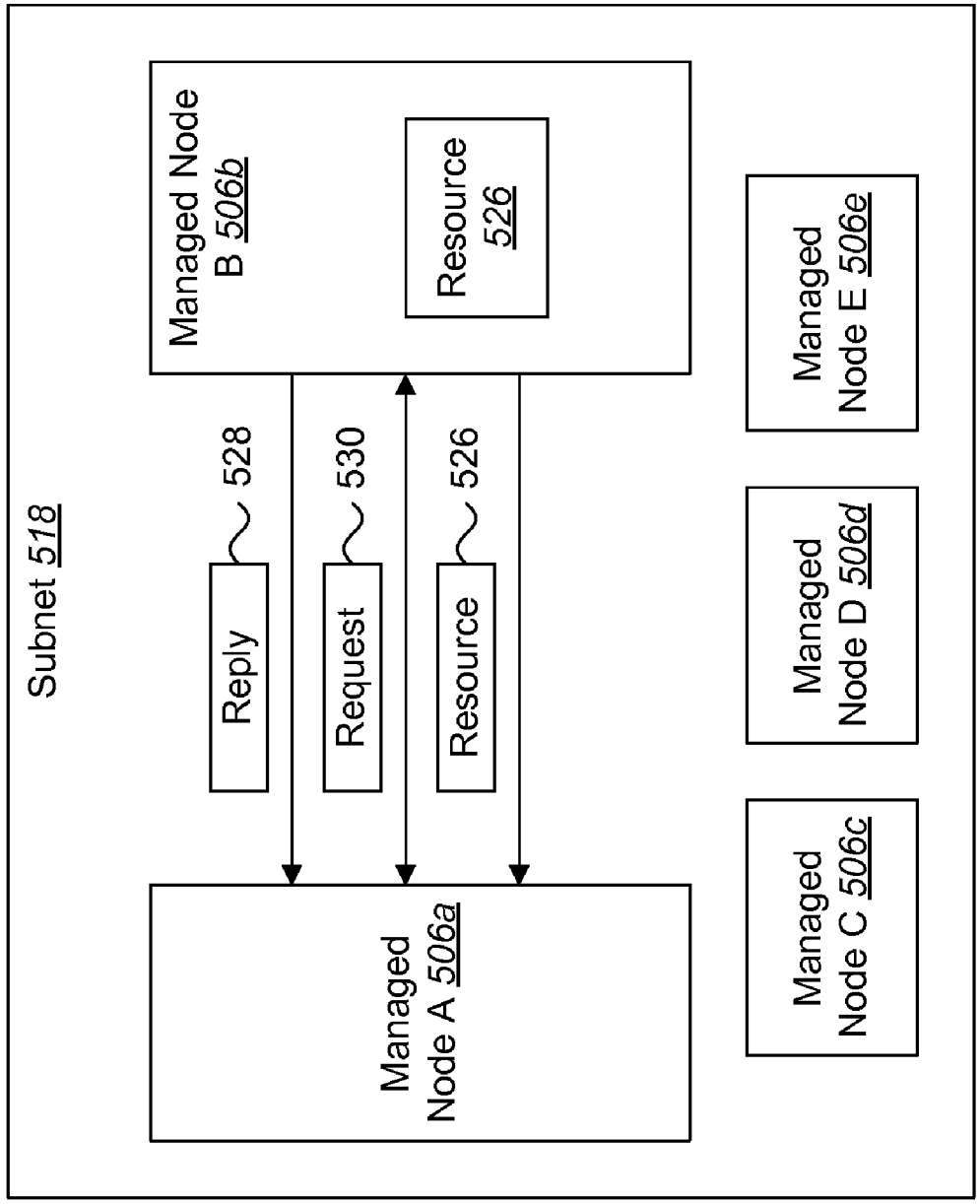
FIG. 5 illustrates an example showing how the managed nodes in the subnet may respond to a discovery request.

FIG. 5 illustrates an example showing how the other managed nodes 506 in the subnet 518 may respond to a discovery request 320 sent from managed node A 506*a*. In the illustrated example, managed node B 506*b* has the desired resource 526. Managed node C 506*c*, managed node D 506*d*, and managed node E 506*e* do not have the desired resource 526.

In response to receiving the discovery request 320, managed node B 506*b* sends a reply 528 to managed node A 506*a*. The reply 528 indicates that managed node B 506*b* has the resource 526 and is capable of transmitting the resource 526 to managed node A 506*a*. Managed node C 506*c*, managed node D 506*d*, and managed node E 506*e* do not reply to the discovery request 320.

In response to receiving the reply 528 from managed node B 506*b*, managed node A 506*a* sends a request 530 to managed node B 506*b* to download the resource 526. In response to the download request 530, managed node B 506*b* transmits the resource 526 to managed node A 506*a*.

Figure 6:
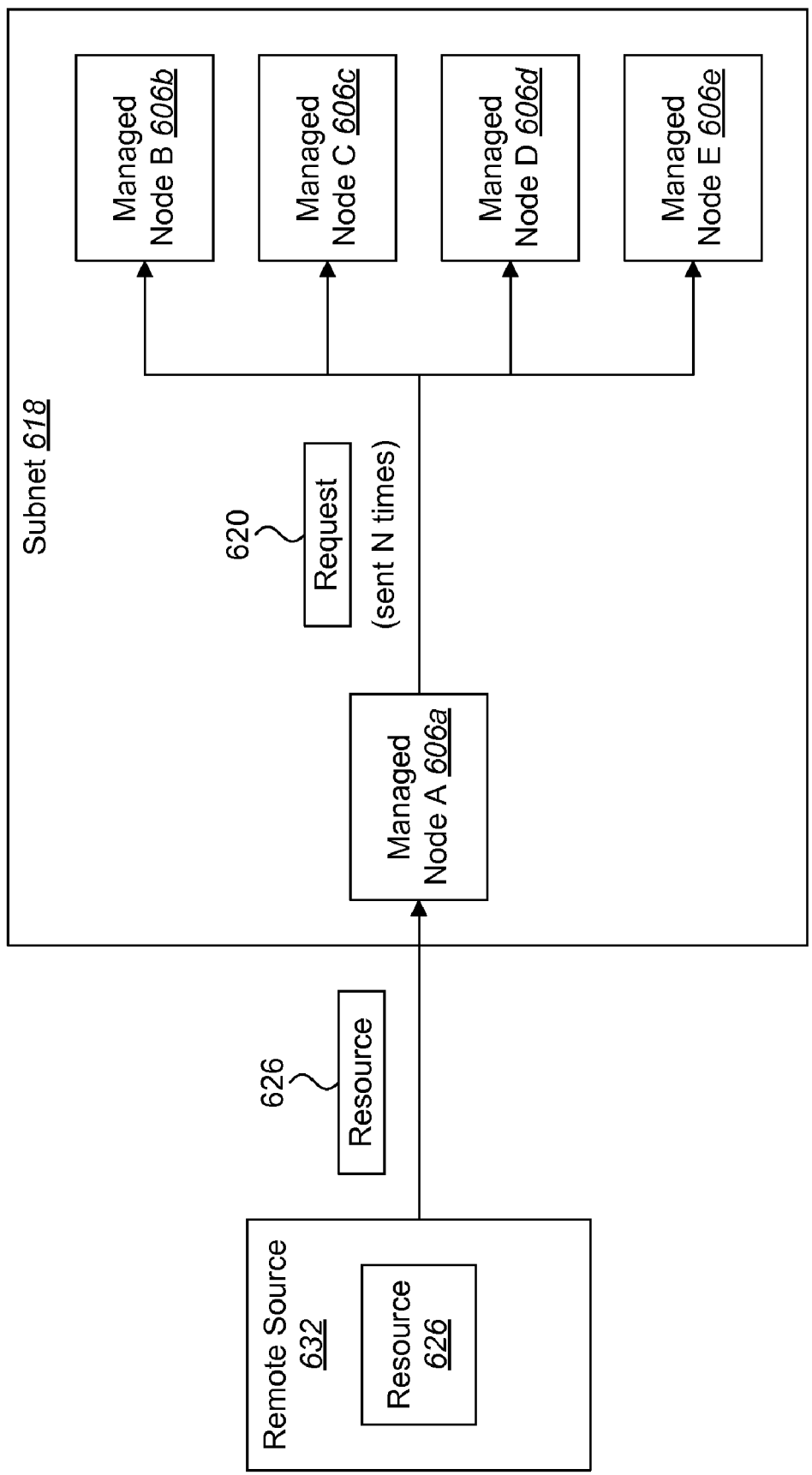
FIG. 6 illustrates another example showing how the managed nodes in the subnet may respond to a discovery request.

FIG. 6 illustrates another example showing how the other managed nodes 606 in the subnet 618 may respond to a discovery request 620 sent from managed node A 606*a*. In the illustrated example, none of the other managed nodes 606 in the subnet 618 (i.e., managed node B 606*b*, managed node C 606*c*, managed node D 606*d*, and managed node E 606*e*) have the desired resource 626. Consequently, none of the managed nodes 606 in the subnet 618 reply to the discovery request 620 sent by managed node A 606*a*.

After waiting for a certain period of time without receiving a response, managed node A 606*a* resends the discovery request 620. Managed node A 606*a* continues to do this until it has sent the discovery request 620 N times without receiving a reply (where N may be any positive integer). The value of N may be specified in a configuration file or the like. Once the discovery request 620 has been sent N times without receiving a reply, then managed node A 606*a* attempts to download the resource 626 from a remote source 632. The remote source 632 may be any computer system that is located somewhere other than on the local network segment (i.e., the subnet 618 in the illustrated embodiment).

Figure 7:
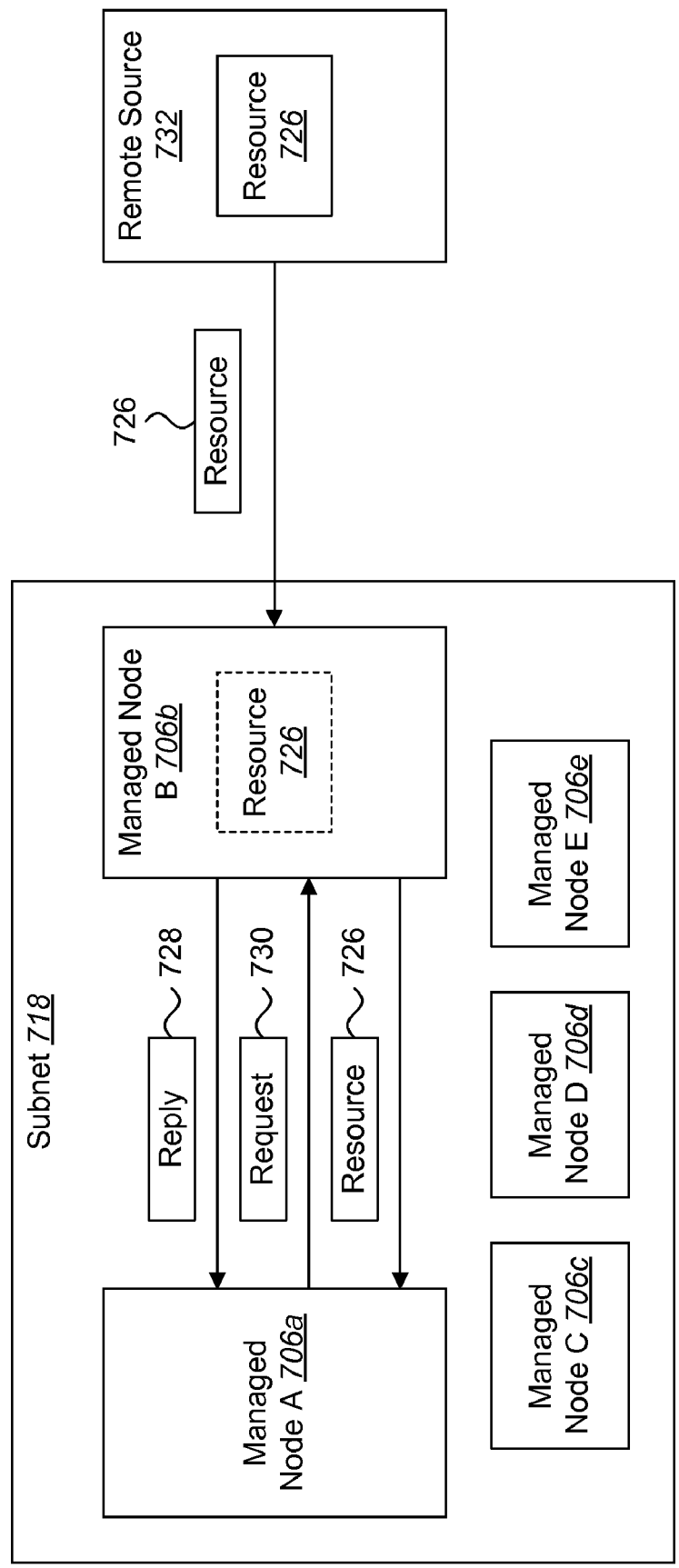
FIG. 7 illustrates another example showing how the managed nodes in the subnet may respond to a discovery request.

FIG. 7 illustrates another example showing how the other managed nodes 706 in the subnet 718 may respond to a discovery request 320 (not shown in FIG. 7) sent from managed node A 706*a*. In the illustrated example, managed node C 706*c*, managed node D 706*d*, and managed node E 706*e* do not have the desired resource 726. These managed nodes 706 do not reply to the discovery request 320 sent by managed node A 706*a*.

Managed node B 706*b* does not have the entire resource 726 when it receives the discovery request 320 from managed node A 706*a*. However, managed node B 706*b* is in the process of downloading the resource 726 from a remote source 732 when it receives the discovery request 320 from managed node A 706*a*. (The resource 726 on managed node B 706*b* is shown in dotted lines to indicate that managed node B 706*b* is downloading the resource 726, but does not have the entire resource 726 yet.)

Managed node B 706*b* sends a reply 728 to the discovery request 320 to managed node A 706*a*. The reply 728 indicates that managed node B 706*b* is downloading the resource 726 from the remote source 732.

In response to receiving the reply 728 from managed node B 706*b*, managed node A 706*a* sends a request 730 to managed node B 706*b* to download the resource 726. In response to the download request 730, managed node B 706*b* transmits the resource 726 to managed node A 706*a*. Managed node B 706*b* may begin transmitting the resource 726 to managed node A 706*a* while it is still downloading the resource 726 from the remote source 732. Alternatively, managed node B 706*b* may wait until it has finished downloading the resource 726 from the remote source 732 before it begins transmitting the resource 726 to managed node A 706*a*.

Figure 8:
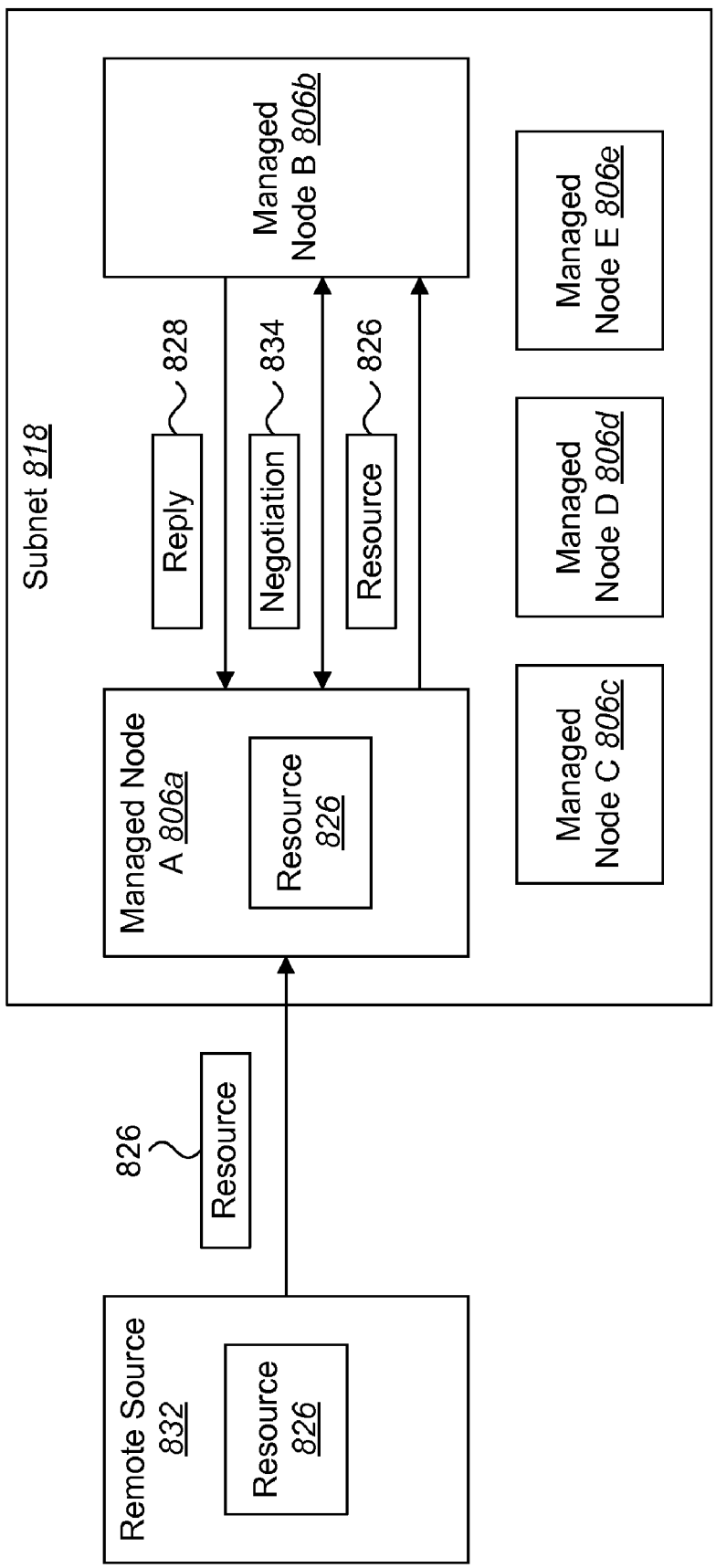
FIG. 8 illustrates another example showing how the managed nodes in the subnet may respond to a discovery request.

FIG. 8 illustrates another example showing how the other managed nodes 806 in the subnet 818 may respond to a discovery request 320 (not shown in FIG. 8) sent from managed node A 806*a*. In the illustrated example, none of the managed nodes 806 in the subnet 818 (i.e., managed node B 806*b*, managed node C 806*c*, managed node D 806*d*, and managed node E 806*e*) have the desired resource 826. However, managed node B 806*b* is seeking to obtain the same resource 826 as managed node A 806*a*. Managed node B 806*b* sends a reply 828 to the discovery request 320 to managed node A 806*a*. The reply 828 indicates that managed node B 806*b* is looking for the resource 826 that was requested by managed node A 806*a*. Managed node C 806*c*, managed node D 806*d*, and managed node E 806*e* do not reply to the discovery request 320.

Managed node A 806*a* and managed node B 806*b* negotiate with one another to determine which of them will download the resource 826 from a remote source 832. This may involve managed node A 806*a* and managed node B 806*b* exchanging one or more negotiation messages 834.

There are a variety of different ways that managed node A 806*a* and managed node B 806*b* may determine which of them is going to download a resource 826 from the remote source 832. For example, the managed node 806 with the lowest IP address may be selected to download the resource 826.

In the illustrated example, managed node A 806*a* is selected to download the resource 826 from the remote source 832. Accordingly, managed node A 806*a* downloads the resource 826 from the remote source 832. Managed node B 806*b* does not download the resource 826 from the remote source 832.

Managed node A 806*a* transmits the resource 826 to managed node B 806*b*. Managed node A 806*a* may begin transmitting the resource 826 to managed node B 806*b* while managed node A 806*a* is still downloading the resource 826 from the remote source 832. Alternatively, managed node A 806*a* may wait until it has finished downloading the resource 826 from the remote source 832 before it begins transmitting the resource 826 to managed node B 806*b*.

Figure 9A:
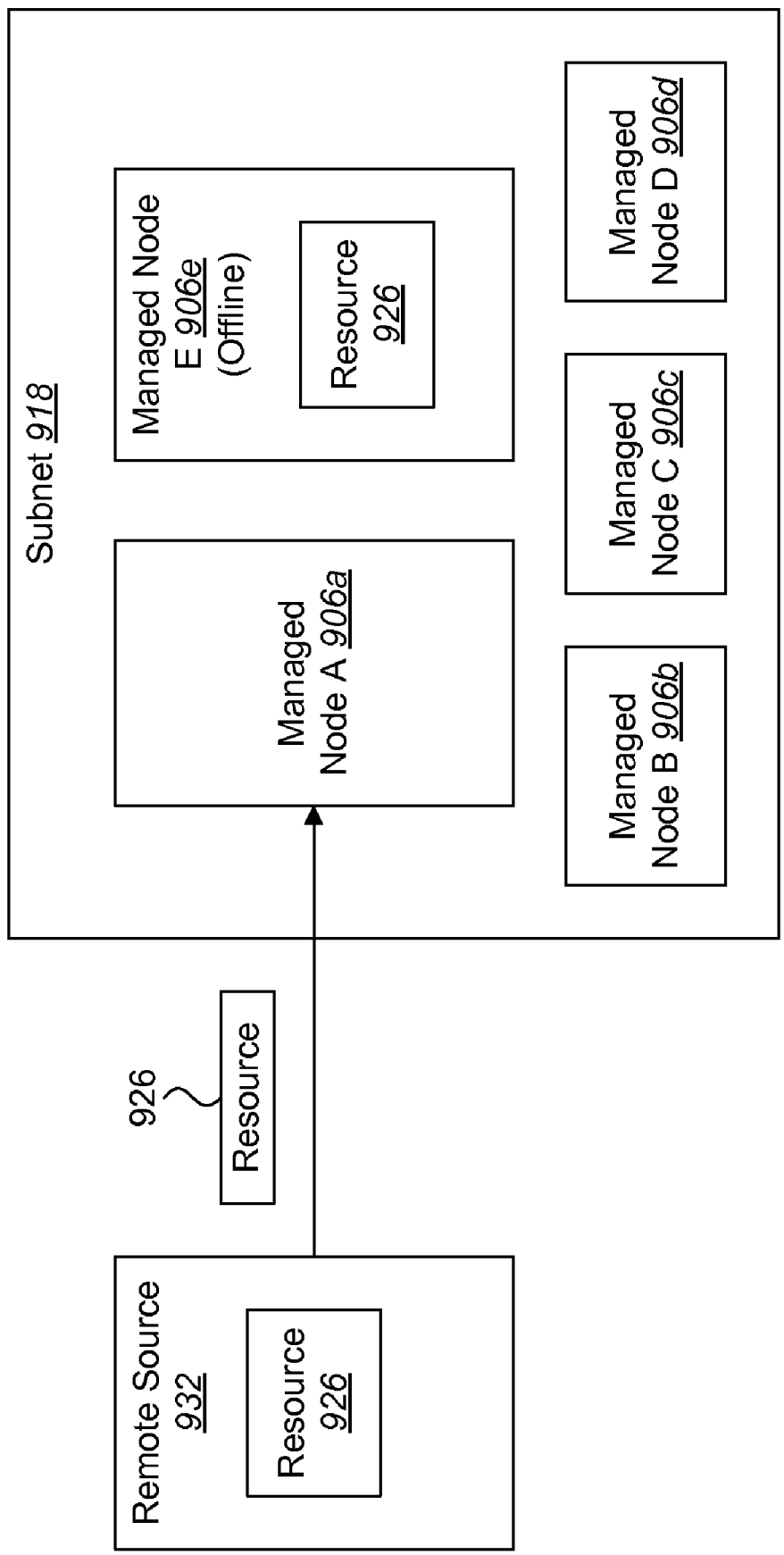
FIGS. 9A-9B illustrate another example showing how the managed nodes in the subnet may respond to a discovery request.
Figure 9B:
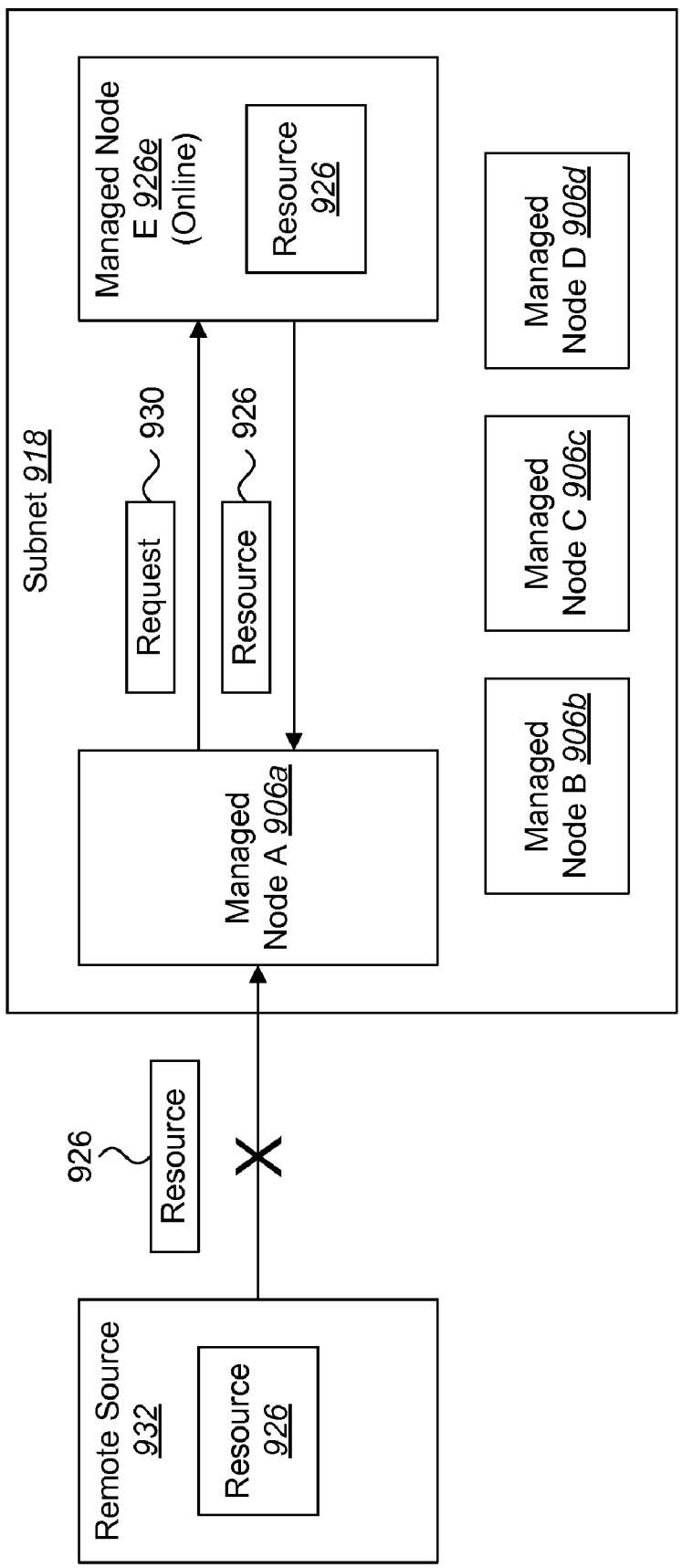

FIGS. 9A-9B illustrate another example showing how the other managed nodes 906 in the subnet 918 may respond to a discovery request 320 (not shown in FIGS. 9A-9B) sent from managed node A 906*a*. As shown in FIG. 9A, managed node B 906*b*, managed node C 906*c*, managed node D 906*d*, and managed node E 906*e* do not have the resource 926. Consequently, they do not reply to the discovery request 320 sent by managed node A 906*a*.

Managed node E 906*e* has the desired resource. However, when managed node A 906*a* sends the discovery request 320, managed node E 906e is offline. Consequently, managed node E 906e does not reply to the discovery request 320 sent by managed node A 906a.

Managed node A 906a periodically resends the discovery request 320 until it has been sent N times, as discussed above in connection with FIG. 6. Managed node E 906e remains offline during this time. As a result, managed node E 906e does not reply to the discovery request 320 sent by managed node A 906a. Because managed node A 906a has sent the discovery request 320 N times without receiving a reply, managed node A 906a begins downloading the resource 926 from a remote source 932.

As shown in FIG. 9B, while managed node A 906a is downloading the resource 926 from the remote source 932, managed node E 906e comes online. While downloading, managed node A 906a continues to send out messages indicating that it is downloading from the remote source 932. When managed node E 906e comes online it sees the messages from managed node A 906a and responds to the message indicating that it has the resource 926 that managed node A 906a is downloading. When managed node A 906a receives the response from managed node E 906e it becomes aware that managed node E 906e has the desired resource 926. In response, managed node A 906a discontinues downloading the resource 926 from the remote source 932. Managed node A 906a sends a request 930 to managed node E 906e to download the resource 926. In response to the download request 930, managed node E 906e transmits the resource 926 to managed node A 906a.

Figure 10:
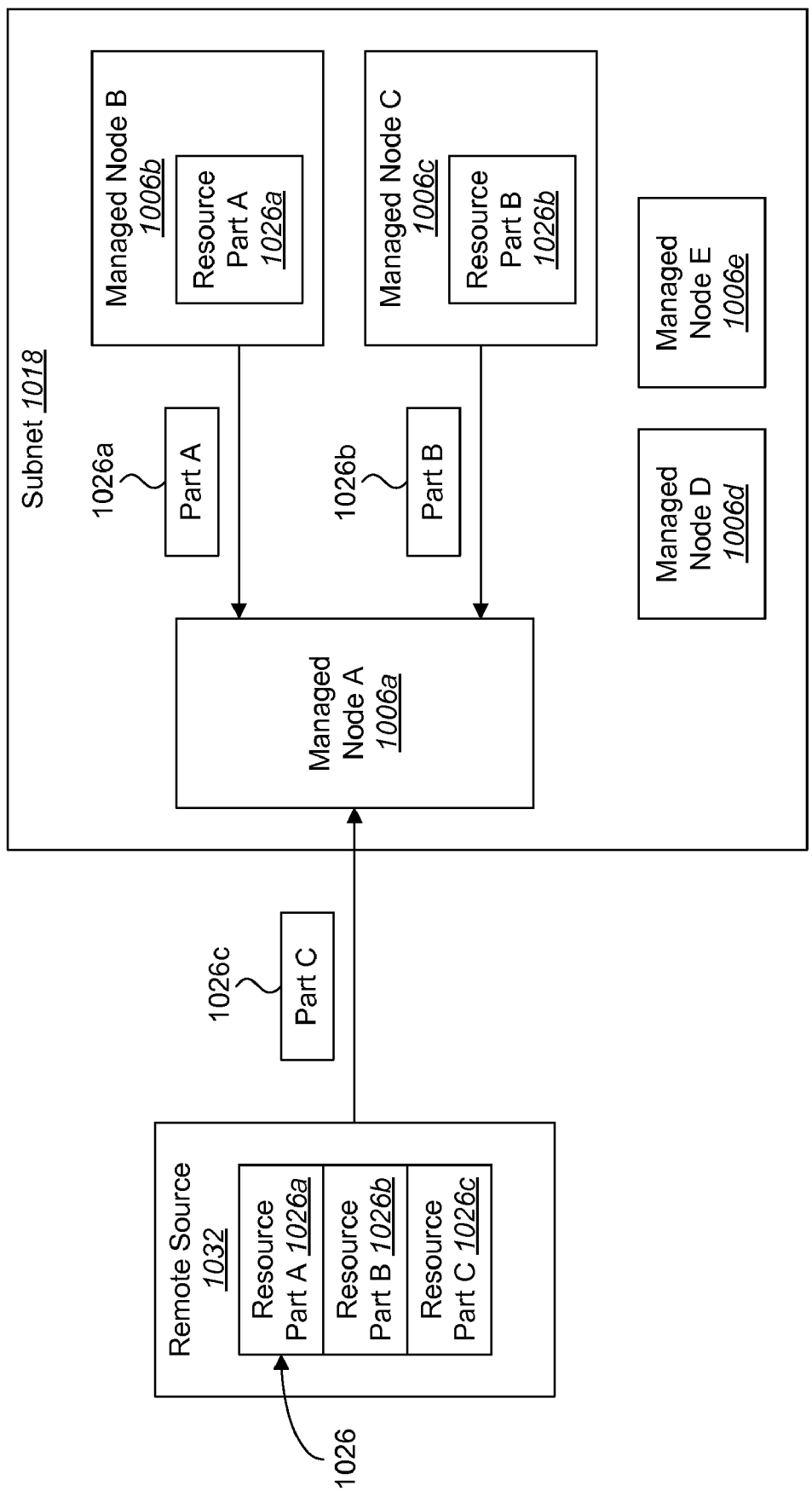
FIG. 10 illustrates another example showing how the managed nodes in the subnet may respond to a discovery request.

FIG. 10 illustrates another example showing how the other managed nodes 1006 in the subnet 1018 may respond to a discovery request 320 (not shown in FIG. 10) sent from managed node A 1006a. In the illustrated example, the resource 1026 includes part A 1026a, part B 1026b, and part C 1026c. Managed node D 1006d and managed node E 1006e do not have any part of the resource 1026. Consequently, they do not reply to the discovery request 320 sent by managed node A 1006a.

Neither managed node B 1006b nor managed node C 1006c has the entire resource 1026. However, both managed node B 1006b and managed node C 1006c have part of the resource 1026. Managed node B 1006b has part A 1026a of the resource. Managed node C 1006c has part B 1026b of the resource. The entire resource 1026 is available from a remote source 1032.

Managed node B 1006b and managed node C 1006c both reply to the discovery request 320. In the reply (not shown) sent from managed node B 1006b, managed node B 1006b notifies managed node A 1006a that part A 1026a of the resource is available from managed node B 1006b. In response, managed node A 1006a downloads part A 1026a of the resource from managed node B 1006b. In the reply (not shown) sent from managed node C 1006c, managed node C 1006c notifies managed node A 1006a that part B 1026b of the resource is available from managed node C 1006c. In response, managed node A 1006a downloads part B 1026b of the resource from managed node C 1006c.

Part C 1026c of the resource is not available from any of the other managed nodes 1006 in the subnet 1018. As a result, managed node A 1006a downloads part C 1026c of the resource from the remote source 1032.

Figure 11:
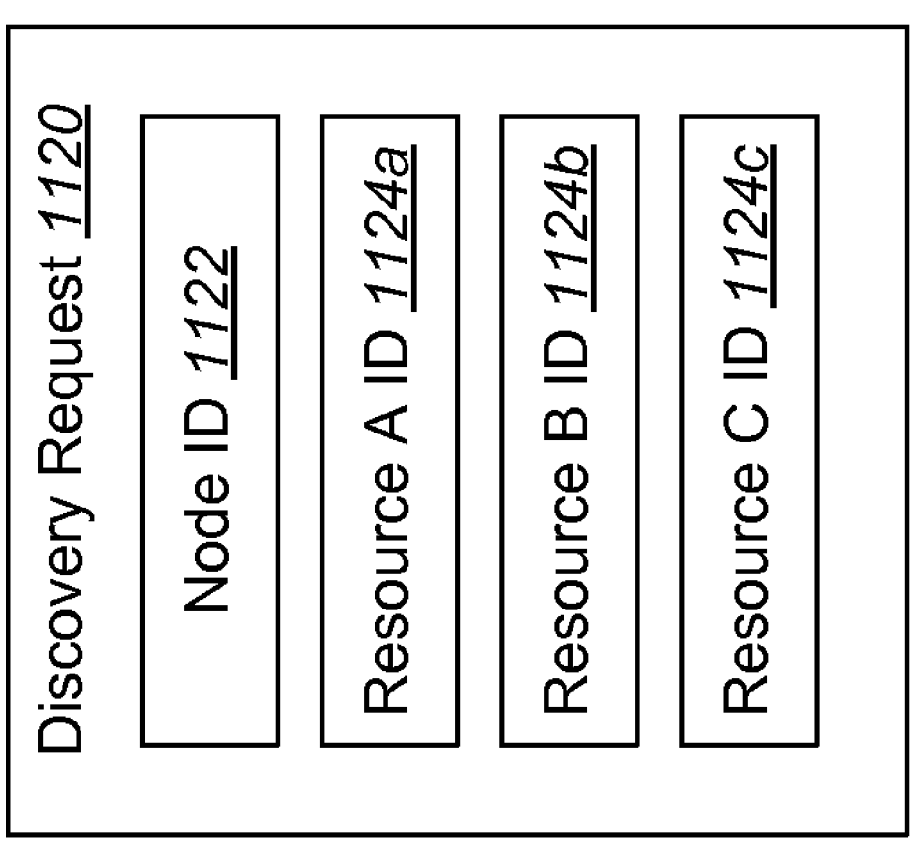
FIG. 11 illustrates another exemplary discovery request that may be sent by a managed node to the other managed nodes in a subnet.

FIG. 11 illustrates another exemplary discovery request 1120 that may be sent by a managed node 306 (such as managed node A 306a in the examples described herein) to the other managed nodes 306 in the subnet 318. As before, the discovery request 1120 includes a node identifier 1122. The node identifier 1122 identifies the managed node 306 that is sending the discovery request 1120.

The discovery request 1120 also includes multiple resource identifiers 1124. In particular, the discovery request 1120 includes an identifier 1124a for resource A, an identifier 1124b for resource B, and an identifier 1124c for resource C. Each resource identifier 1124 identifies a resource 326 that the managed node 306 is seeking to obtain. Although the example in FIG. 11 shows three resource identifiers 1124a-c in the request 1120, this is only done for the purpose of illustration. Any number of resource identifiers 1124 may be included in the discovery request.

Figure 12:
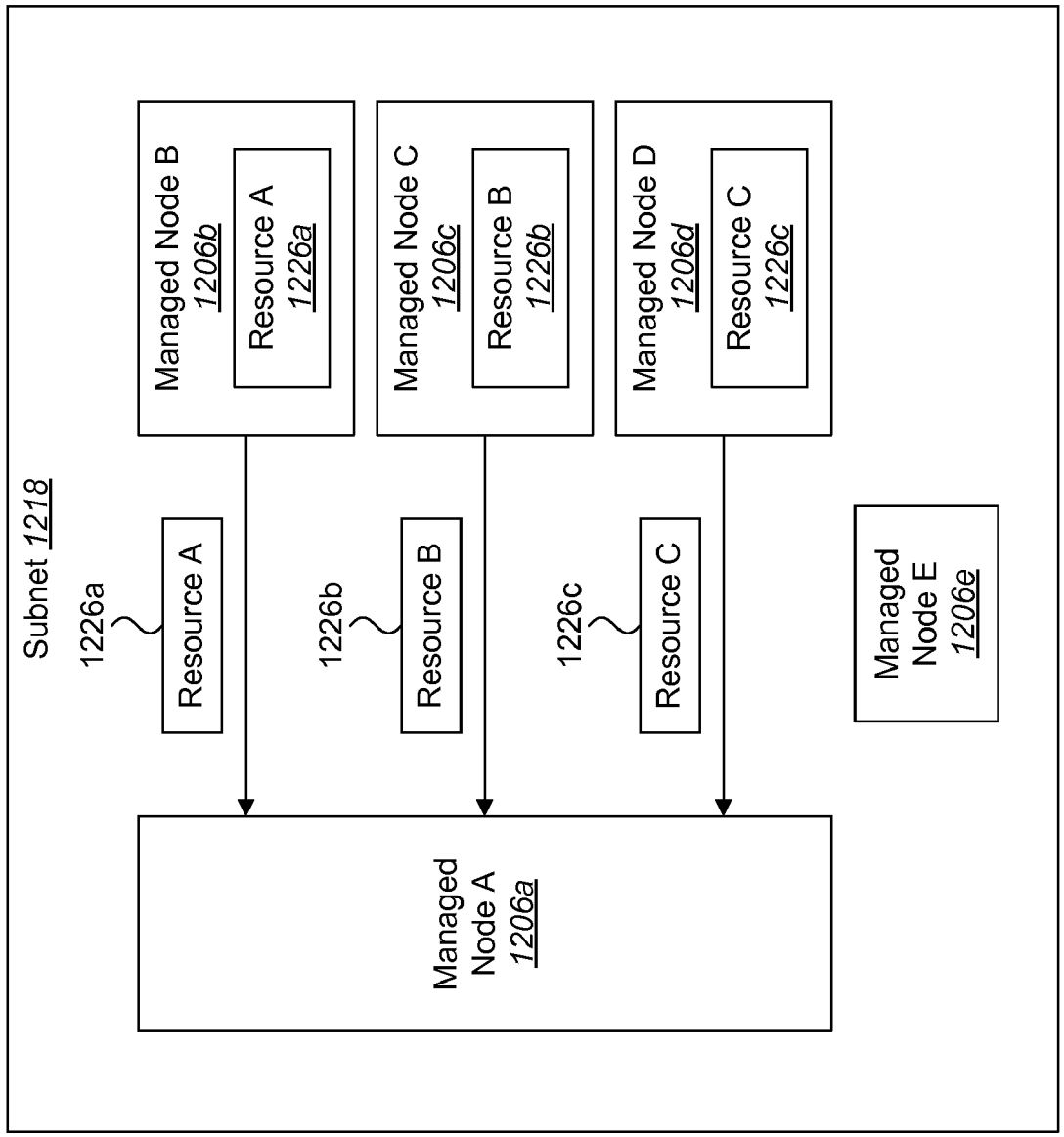
FIG. 12 illustrates an example showing how the managed nodes in a subnet may respond to the discovery request shown in FIG. 11.

FIG. 12 illustrates an example showing how the other managed nodes 1206 in the subnet 1218 may respond to managed node A 1206a sending the discovery request 1120 shown in FIG. 11. Managed node E 1206e does not have resource A 1226a, resource B 1226b, or resource C 1226c. Consequently, managed node E 1206e does not reply to the discovery request 1120.

Managed node B 1206b includes resource A 1226a. Managed node C 1206c includes resource B 1226b. Managed node D 1206d includes resource C 1226c. Managed node B 1206b, managed node C 1206c, and managed node D 1206d each reply to the discovery request 1120. In the reply (not shown) sent from managed node B 1206b, managed node B 1206b notifies managed node A 1206a that resource A 1226a is available from managed node B 1206b. In response, managed node A 1206a downloads resource A 1226a from managed node B 1206b. In the reply (not shown) sent from managed node C 1206c, managed node C 1206c notifies managed node A 1206a that resource B 1226b is available from managed node C 1206c. In response, managed node A 1206a downloads resource B 1226b from managed node C 1206c. In the reply (not shown) sent from managed node D 1206d, managed node D 1206d notifies managed node A 1206a that resource C 1226c is available from managed node D 1206d. In response, managed node A 1206a downloads resource C 1226c from managed node D 1206d.

Figure 13:
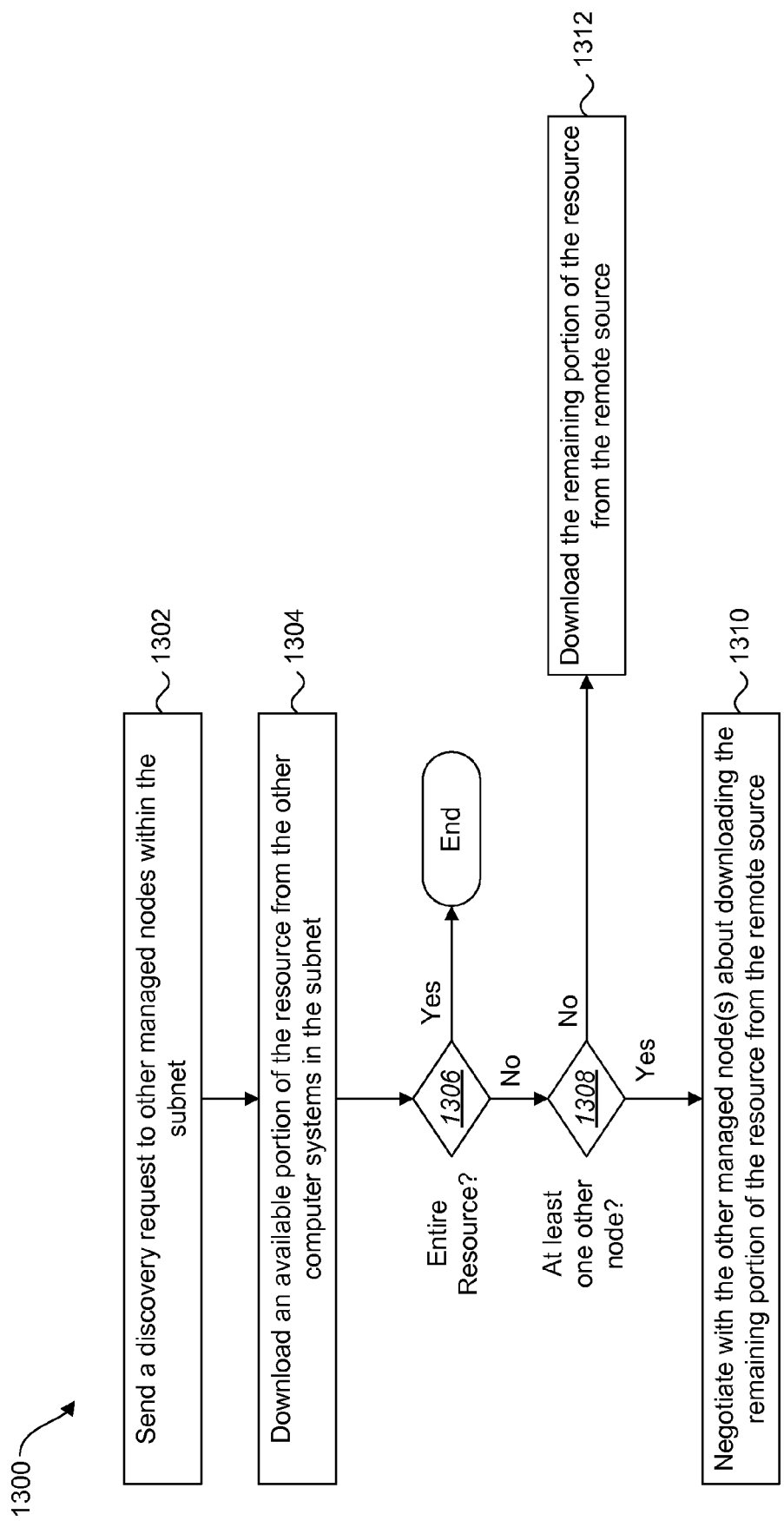
FIG. 13 illustrates a method which illustrates the operation of a managed node within a subnet according to an embodiment.

FIG. 13 illustrates a method 1300 which illustrates the operation of a managed node 306 within a subnet 318 according to an embodiment. In accordance with the method 1300, the managed node 306 sends 1302 a discovery request 320 to other managed nodes 306 within the subnet 318.

The managed node 306 downloads 1304 an available portion of the resource 526 from the other managed nodes 306 in the subnet 318. The term "available portion" refers to whatever part of the resource 526 is available from the other managed nodes 306 in the subnet 318, which may be the entire resource 526 (as shown in FIG. 5), part of the resource 526 (as shown in FIG. 10), or none of the resource 526 (as shown in FIG. 6). The managed node 306 may download the available portion of the resource 526 from a single managed node 306 (as shown in FIG. 5), or from multiple managed nodes 306 (as shown in FIG. 10).

If the managed node 306 is able to obtain 1306 the entire resource 526 from the managed nodes 306 within the subnet 318, then the method 1300 ends. However, if the managed node 306 is not able to obtain 1306 the entire resource 526 from the managed nodes 306 within the subnet 318, and if there is 1308 at least one other managed node 306 that is seeking to obtain the same resource 526, then the managed node 306 negotiates 1310 with the other managed node(s) 306 about downloading the remaining portion of the resource 526 from a remote source 632. The term "remaining portion" refers to whatever part of the resource 526 is not available from the other managed nodes 306 in the subnet 318, which may be the entire resource 526 (as shown in FIG. 6) or part of the resource 526 (as shown in FIG. 10). The negotiations result in one of the managed nodes 306 being selected to download the remaining portion of the resource 526 from the remote source 632. However, if the managed node 306 is the only managed node 306 that is seeking to obtain the remaining portion of the resource 526, then the managed node 306 downloads 1312 the remaining portion of the resource 526 from the remote source 632.

The network segment that has been utilized in the embodiments described above has been a subnet. However, embodiments are not limited in this regard. For example, in some alternative embodiments, the methods disclosed herein may be practiced by the computer systems within a multicast alias domain. A multicast alias domain consists of all computers that can see each other's multicast traffic without crossing a router.

Various communication technologies may be used in embodiments disclosed herein. For example, multicast technology may be used to reach all machines with a multicast alias domain. Additional details about multicast domains are disclosed in U.S. Published Patent Application No. 2003/0039215, titled "Method and Apparatus for Dynamically Discovering Multicast Alias Domains," with inventors David A. Eatough and Gregory P. Olsen. This patent application is hereby incorporated by reference in its entirety. Additional details about how multicast technology may be used to download files from within the same subnet are disclosed in U.S. Published Patent Application No. 2003/0187931, titled "Facilitating Resource Access Using Prioritized Multicast Responses To A Discovery Request," with inventors Gregory P. Olsen and David A. Eatough, and U.S. Published Patent Application No. 2002/0110084, titled "Application Based Bandwidth Limiting Proxies," with inventors Alan B. Butt, David A. Eatough, and Tony N. Sarra. Both of these patent applications are hereby incorporated by reference in their entirety. Other communication technologies, such as broadcasts, may also be used. The discovery request could also be sent to all machines in the network using a point to point protocol.

Embodiments disclosed herein have been described in terms of managed nodes on a computer network. However, embodiments are not limited in this regard. In fact, embodiments may be practiced in any computer network that comprises a plurality of interconnected computer systems.

Figure 14:
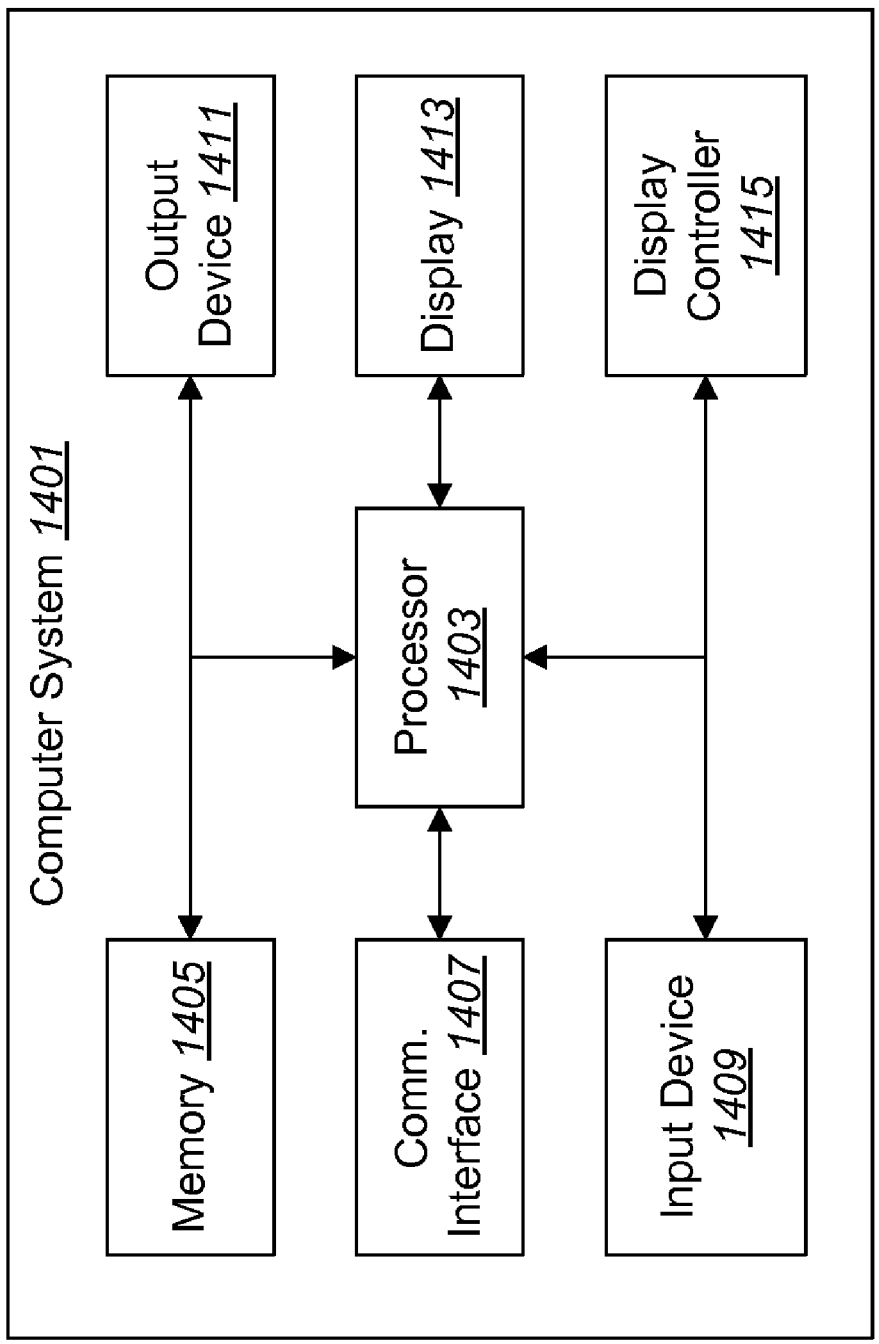
FIG. 14 is a block diagram illustrating the major hardware components typically utilized in a computer system.

FIG. 14 is a block diagram illustrating the major hardware components typically utilized in a computer system 1401. The illustrated components may be located within the same physical structure or in separate housings or structures.

The computer system 1401 includes a processor 1403 and memory 1405. The processor 1403 controls the operation of the computer system 1401 and may be embodied as a microprocessor, a microcontroller, a digital signal processor (DSP) or other device known in the art. The processor 1403 typically performs logical and arithmetic operations based on program instructions stored within the memory 1405.

As used herein, the term memory 1405 is broadly defined as any electronic component capable of storing electronic information, and may be embodied as read only memory (ROM), random access memory (RAM), magnetic disk storage media, optical storage media, flash memory devices in RAM, on-board memory included with the processor 1403, EPROM memory, EEPROM memory, registers, etc. The memory 1405 typically stores program instructions and other types of data. The program instructions may be executed by the processor 1403 to implement some or all of the methods disclosed herein.

The computer system 1401 typically also includes one or more communication interfaces 1407 for communicating with other electronic devices. The communication interfaces 1407 may be based on wired communication technology, wireless communication technology, or both. Examples of different types of communication interfaces 1407 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 1401 typically also includes one or more input devices 1409 and one or more output devices 1411. Examples of different kinds of input devices 1409 include a keyboard, mouse, microphone, remote control device, button, joystick, trackball, touchpad, lightpen, etc. Examples of different kinds of output devices 1411 include a speaker, printer, etc. One specific type of output device which is typically included in a computer system is a display device 1413. Display devices 1413 used with embodiments disclosed herein may utilize any suitable image projection technology, such as a cathode ray tube (CRT), liquid crystal display (LCD), light-emitting diode (LED), gas plasma, electroluminescence, or the like. A display controller 1415 may also be provided, for converting data stored in the memory 1405 into text, graphics, and/or moving images (as appropriate) shown on the display device 1413.

Of course, FIG. 14 illustrates only one possible configuration of a computer system 1401. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for efficiently using network bandwidth to download resources, the method being implemented by a computer system within a segment of a computer network, the method comprising:
   sending a discovery request to other computer systems within the network segment, wherein the discovery request comprises a request for at least one resource;
   downloading an available portion of the at least one resource from the other computer systems in the network segment; and
   if there is a remaining portion of the at least one resource that is not available from the other computer systems in the network segment but that is available from a remote source, and if there is at least one other computer system in the network segment that is also seeking to obtain the remaining portion of the at least one resource, negotiating with the at least one other computer system about downloading the remaining portion of the at least one resource from the remote source.

2. The method of claim 1, wherein downloading the available portion of the at least one resource from the other computer systems in the network segment comprises downloading the entire resource from a single computer system within the network segment.

3. The method of claim 1, wherein downloading the available portion of the at least one resource from the other computer systems in the network segment comprises discontinuing to download the at least one resource from the remote source when another computer system in the network segment that has the resource comes online.

4. The method of claim 1, wherein downloading the available portion of the at least one resource from the other computer systems in the network segment comprises downloading a first part of the at least one resource from a first computer system within the network segment and downloading a second part of the resource from a second computer system within the network segment.

5. The method of claim 1, wherein the remaining portion of the at least one resource comprises the entire resource.

6. The method of claim 1, wherein the remaining portion of the at least one resource comprises part of the at least one resource.

7. The method of claim 1, wherein negotiating comprises selecting a single computer system within the network segment to download the at least one resource from the remote source.

8. The method of claim 1, wherein negotiating comprises determining which of the computer system and the at least one other computer system has the lowest IP address.

9. The method of claim 1, wherein the discovery request comprises an identifier for the computer system and at least one other identifier for the at least one resource.

10. The method of claim 1, wherein the computer system is a managed node in a computer network.

11. The method of claim 1, wherein the network segment is a subnet within the computer network.

12. The method of claim 1, wherein the network segment is a multicast alias domain within the computer network.

13. A computer system that is configured to implement a method for efficiently using network bandwidth to download resources, the computer system comprising:
   a processor;
   memory in electronic communication with the processor;
   instructions stored in the memory, the instructions being executable to implement a method comprising:
      sending a discovery request to other computer systems within a segment of a computer network, wherein the discovery request comprises a request for at least one resource;
      downloading an available portion of the at least one resource from the other computer systems in the network segment; and
      if there is a remaining portion of the at least one resource that is not available from the other computer systems in the network segment but that is available from a remote source, and if there is at least one other computer system in the network segment that is also seeking to obtain the remaining portion of the at least one resource, negotiating with the at least one other computer system about downloading the remaining portion of the at least one resource from the remote source.

14. The computer system of claim 13, wherein downloading the available portion of the at least one resource from the other computer systems in the network segment comprises downloading the entire resource from a single computer system within the network segment.

15. The computer system of claim 13, wherein downloading the available portion of the at least one resource from the other computer systems in the network segment comprises discontinuing to download the at least one resource from the remote source when another computer system in the network segment that has the resource comes online.

16. The computer system of claim 13, wherein downloading the available portion of the at least one resource from the other computer systems in the network segment comprises downloading a first part of the at least one resource from a first computer system within the network segment and downloading a second part of the resource from a second computer system within the network segment.

17. A computer-readable storage medium comprising executable instructions for implementing a method for efficiently using network bandwidth to download resources, the method being implemented by a computer system within a segment of a computer network, the method comprising:

sending a discovery request to other computer systems within the network segment, wherein the discovery request comprises a request for at least one resource;

downloading an available portion of the at least one resource from the other computer systems in the network segment; and if there is a remaining portion of the at least one resource that is not available from the other computer systems in the network segment but that is available from a remote source, and if there is at least one other computer system in the network segment that is also seeking to obtain the remaining portion of the at least one resource, negotiating with the at least one other computer system about downloading the remaining portion of the at least one resource from the remote source.

18. The computer-readable storage medium of claim 17, wherein downloading the available portion of the at least one resource from the other computer systems in the network segment comprises downloading the entire resource from a single computer system within the network segment.

19. The computer-readable storage medium of claim 17, wherein downloading the available portion of the at least one resource from the other computer systems in the network segment comprises discontinuing to download the at least one resource from the remote source when another computer system in the network segment that has the resource comes online.

20. The computer-readable storage medium of claim 17, wherein downloading the available portion of the at least one resource from the other computer systems in the network segment comprises downloading a first part of the at least one resource from a first computer system within the network segment and downloading a second part of the resource from a second computer system within the network segment.

* * * * *

UNITED STATES PATENT AND TRADEMARK OFFICE
CERTIFICATE OF CORRECTION

PATENT NO. : 7,529,809 B1
APPLICATION NO. : 11/294248
DATED : May 5, 2009
INVENTOR(S) : David A. Eatough et al.

It is certified that error appears in the above-identified patent and that said Letters Patent is hereby corrected as shown below:

In col. 4, line 38 please replace "subnet 1226" with --subnet I 226--.

Signed and Sealed this

Twenty-seventh Day of October, 2009

David J. Kappos
*Director of the United States Patent and Trademark Office*